Jan. 2, 1962    H. C. N. HECKEL ETAL    3,015,686
ARTICLE OF MANUFACTURE UTILIZING A STRANDED CORE
CONSTRUCTION AND METHOD OF MAKING
Filed Aug. 28, 1958    2 Sheets-Sheet 1
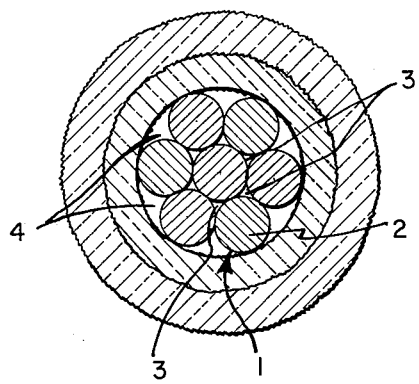
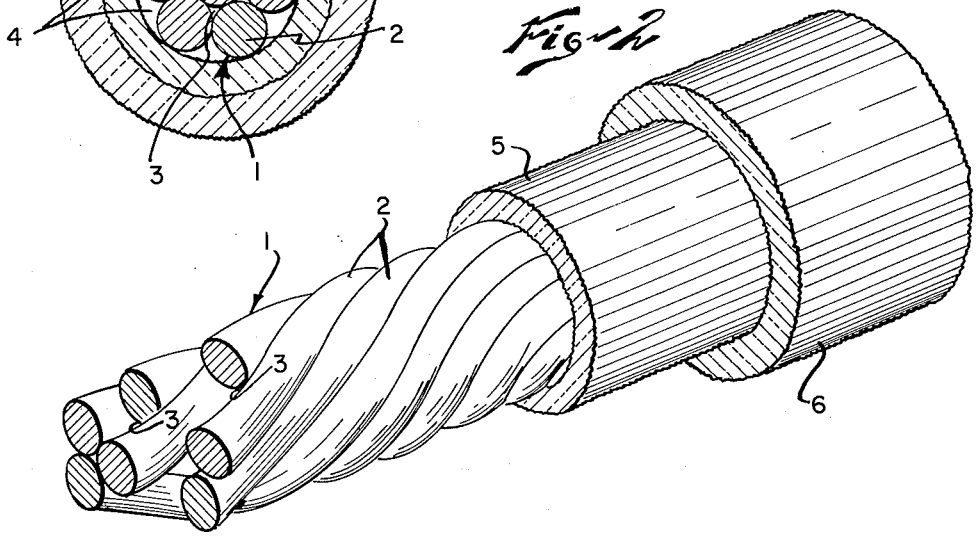
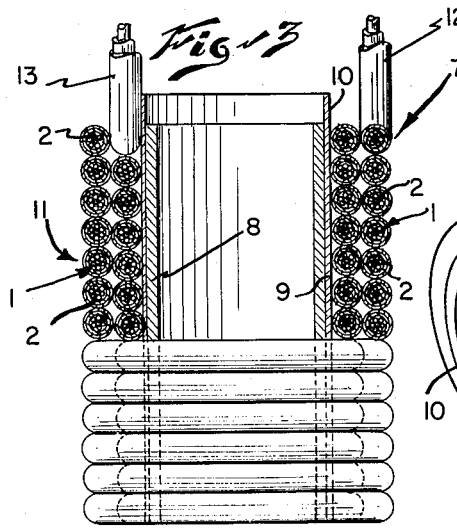
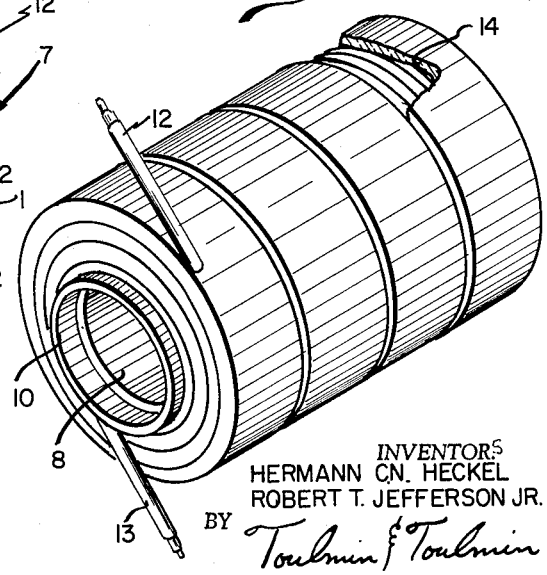
INVENTORS
HERMANN C.N. HECKEL
ROBERT T. JEFFERSON JR.
BY Toulmin & Toulmin
ATTORNEYS Jan. 2, 1962   H. C. N. HECKEL ETAL   3,015,686
ARTICLE OF MANUFACTURE UTILIZING A STRANDED CORE
CONSTRUCTION AND METHOD OF MAKING
Filed Aug. 28, 1958   2 Sheets-Sheet 2
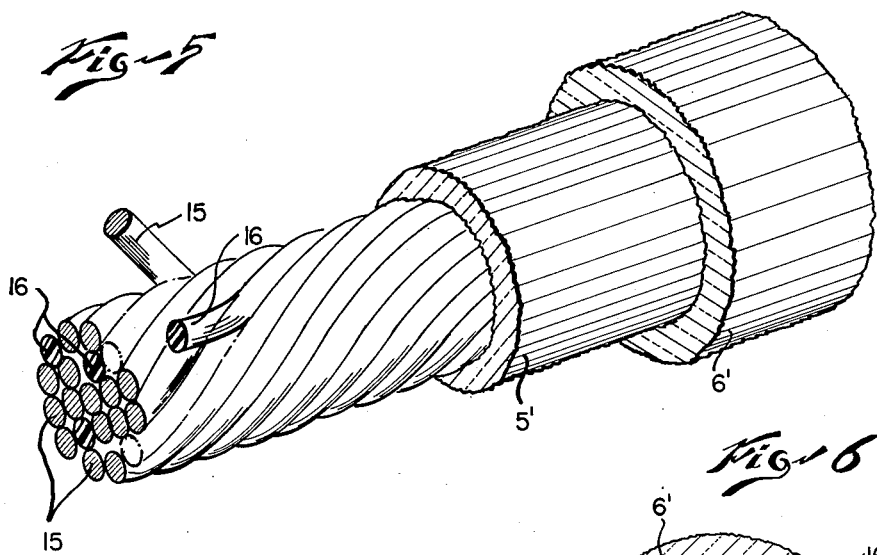
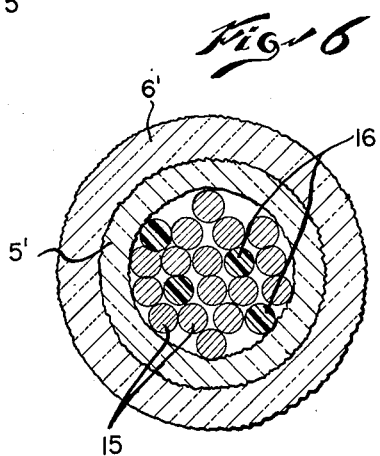
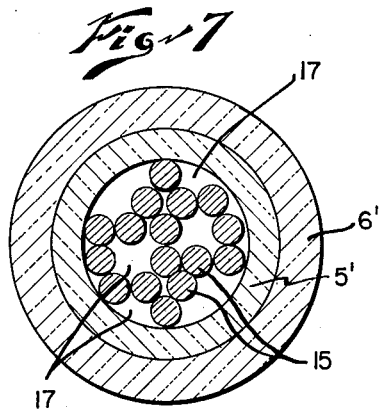
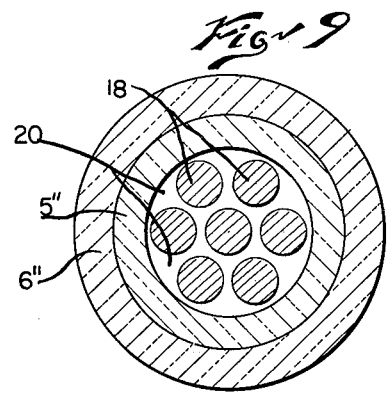
INVENTORS
HERMANN CN. HECKEL
ROBERT T. JEFFERSON JR.
BY
Toulmin & Toulmin
ATTORNEYS United States Patent Office 3,015,686
Patented Jan. 2, 1962

3,015,686
ARTICLE OF MANUFACTURE UTILIZING A STRANDED CORE CONSTRUCTION AND METHOD OF MAKING
Hermann C. N. Heckel, Oxford, and Robert T. Jefferson, Jr., Dayton, Ohio, assignors, by mesne assignments, to Rea Magnet Wire Company, Inc., Fort Wayne, Ind., a corporation of Delaware
Filed Aug. 28, 1958, Ser. No. 757,789
4 Claims. (Cl. 174—122)

This invention relates to improvements in insulated electrical conductors, components produced from such conductors and particularly to the insulation-wire combination of the conductors and components.

The provision of electrical components which will withstand high temperatures is one primary object of this invention. Heretofore such components have included as insulation material glass, both in fibrous and solid form. Difficulty is experienced, however, with such components because of the adverse effects created by the expansion and contraction of the wire conductor in excess of the insulation, which leads to cracking and rupture of the electrical insulation material. This is overcome in the practice of the present invention by so providing the wire conductor and the insulation itself with the effects of expansions and contractions are absorbed within the structure.

Specifically in the practice of this invention the conductor core is formed at least partially of stranded wire; the wire itself then provides small cavities between adjacent wires which permits of substantially free expansion and contraction of the wire in all directions. To increase the capacity of the cavities the wire may be stranded with a material which is removable in the course of manufacture of the component to leave larger cavities. Accordingly when the component or conductor is heated the wire has room for expansion.

The insulation material of the component is provided in at least two layers, a first inner, resilient wrapping layer of a material which is not reactive chemically with the material of the wire even under high temperature conditions; and a second outer sheath layer which is of lower softening point than the inner layer—but still relatively high in softening point.

The wrapping or inner layer is in contact with and surrounds the stranded core; however, it is free of the core to permit of elongation and contraction of the wire of the core, as well as radial expansion and contraction. The resilient nature of this covering is important particularly with respect to coil components. When the wire and insulation of such a component cools the wire contraction is the greater and tends, in the shortening of the wire, to stress adjacent insulation. For example, a wire of an upper turn of a coil normally exerts considerable stress on the insulation of a wire of an underlying turn, frequently occasioning insulation cracking. By providing for a degree of resiliency in the insulation, particularly that insulation adjacent the stranded core, the stress is very materially reduced and cracking avoided.

Further to avoid any bonding of the inner insulation layer of the conductor with the conductive wire, the material of the inner layer is suitably substantially inert chemically.

The characteristics required for the above noted wrapping are found in high silica content materials, such as silica fiber, aluminum silicate fiber and mica. Suitable fiber in yarn form having a silica content of about 96 percent is obtainable by extraction of oxides of glass—one such commercial material is termed Refrasil.

The sheath or outer layer is suitably a glass fiber in yarn form such as is used for electrical insulation purposes. A suitable fiber for the purpose is E (electrical) glass fiber; E glass treated with methacrylato chromic chloride sinters at about 825° C. and is suitable for the purpose. The sintering temperature should of course be lower than that at which the inner layer material or the conductive wire of the core would lose integrity.

In the practice of the method of invention, in the formation of coils for example, the turns of the coil are retained together and the coil insulation impermeability is improved by the sintering of the outer layer while it is in contact with the inner layer. The sintering provides a film over the inner layer which is impervious and accordingly in service inhibits oxidation of the conductor. The film sufficiently rigidizes a formed coil for handling, but is not a mechanical bond of great strength, nor does it affect the resiliency of the fiber of the inner layer.

The insulated conductor is flexible, readily wound into a coil, and the expansion-cavities extending through the conductor contribute to the flexibility as well as accommodating the volumetric change of the conductor with temperature.

In instance where larger expansion cavities are desired the removable material of the stranded core is usually expelled under temperature conditions somewhat lower than that of the sintering operation. Therefore the removable core material is expelled prior to sintering.

The invention will be more fully understood by reference to the following detailed description and accompanying drawings wherein:

FIGURE 1 is a sectional view of an insulated electrical conductor in accordance with the invention;

FIGURE 2 is a perspective view of the insulated conductor of FIGURE 1;

FIGURE 3 is an elevational view, partially in section, illustrating a coil produced with the insulated conductor of FIGURES 1 and 2;

FIGURE 4 is a perspective view of a fully encapsulated coil produced in accordance with the invention;

FIGURE 5 is a perspective view illustrating a further modification of an insulated electrical conductor useful in the practice of the invention and wherein the stranded core includes wire and plastic strands intertwisted;

FIGURE 6 is a sectional view of the insulated electrical conductor of FIGURE 5;

FIGURE 7 is a sectional view of the electrical conductor of FIGURE 6 but with the plastic strands removed;

FIGURE 8 is a sectional view of a further embodiment of the insulated conductor useful in the practice of the invention and in which the plastic is provided as a coating on intertwisted wire strands; and FIGURE 9 is a sectional view of the conductor of FIGURE 8 with the plastic coatings removed.

Referring to the drawings more in detail, indicated generally at 1 in FIGURE 1 is a stranded conductor comprised of a plurality of copper wires indicated at 2. The stranded conductor forms an electrically conductive core, between the wires of which, and around the wires of which, there exists voids or expansion cavities indicated at 3. Also additional cavities 4 exist between the electrically conductive core and a wrapping 5 of high softening point inorganic material. The size of the cavities is controllable by the wire size and degree of twisting.

A suitable wrapping is comprised of layers of Refrasil yarn; Refrasil is a high silica content substantially alkali-free fiber comprised of approximately 96 percent silica and the remainder being inorganic oxides. The material of the wrapping 5 has a high softening point well above 850° C. Further this high silica content fiber does not react with the copper of the wire even under high temperature conditions, and the wrapping is slippable relative to the conductor core. In effect the wrapping is in sleeve-like relation with the core.

The wrapping 5 is itself provided with a sheath 6 suitably constituted of a winding of yarn of an electrical glass, also preferably substantially alkali-free. Suitably commercially available E glass, treated with methacrylato chromic chloride, is employed. This glass yarn has a relatively low sintering point of about 825° C.

The wrapping is suitably provided to the extent of 1.2 grams per foot of conductor length, while the sheath is provided to the extent of 1.5 grams per foot of length.

The electrical conductor of FIGURE 2, formed with No. 33 bare copper wire, is quite flexible and may be readily formed into a coil structure such as that illustrated in FIGURE 3 at 7. For the purpose of forming the coil a spool 8 of a heat-resistant material, such as Steatite or ceramic, is provided and this is initially wound with a layer 9 of a high softening point material in tape form. Suitably the material is an aluminum silicate available commercially as Fiberfrax.

As shown in FIGURE 3, the Fiberfrax is provided to have an extremity 10 which extends slightly beyond the spool 8. This is for the purpose of permitting the spool and the fiber to be readily removed from the completed coil should such be desired.

A plurality of windings of the electrical conductor of FIGURES 1 and 2 are provided on the Fiberfrax to form a coil body 11. Extremities of the electrical conductor provide leads 12, 13 which extend from the coil.

After formation of the coil body the coil is subjected in an oven to a temperature of about 825–850° C. This occasions a sintering of the material of the sheath 6 to form a film over the turns. This sintering is effective to cause some slight amount of the material of the sheath to enter interstices of the wrapping 5, but is insufficient to occasion any substantial flow of the material of the sheath 6; nor does the inner fibrous layer lose resiliency. Accordingly there is no bonding of the core 1 to either the wrapping 5 or the sheath 6; also only slight bonding occurs between adjacent turns of the coil to provide the coil in a rigid condition when it is cooled.

Sintering occurs over a period of approximately 30 minutes at the temperature indicated. Thereafter the coil is cooled slowly to about 650° C., the glass of the sheath 6 being hardened at approximately 800° C. Preferably the coil is maintained at about 650° C. for a period of about one-half hour to insure of relieving of strains in the glass itself. Suitably also the coil is then cooled over a period of about one hour to about 550° C., where it is again maintained for an additional period of about one hour. Such practice in the annealing point range of the E glass is desirable to avoid any possibility of cracking in the insulation of the ultimate product.

It is to be noted that in the initial stages of the cooling of the coil the glass is in somewhat a plastic state, while the copper shrinks as the temperature of the coil approaches the annealing point. At the annealing point the glass is set hard and the copper shrinks more in volume than does the glass. However, the high softening point material which surrounds the conductor is not bonded to the metal in any way, and the copper may shrink freely in any direction without occasioning strains in the glass insulation.

Any material adherence of the glass to the copper would normally tend to crack the glass, due to the difference in coefficient of expansion between the materials. Since, however, the expansion cavities are present to provide for free volumetric expansion and contraction of the metal, the cracking in inhibited. With respect to the expansion cavities, it is to be particularly noted that many of these cavities are dispersed in the core itself, a factor which contributes materially to the improved coil.

Further, it is to be noted that as the conductor tends to contract, the radial dimension of the coil itself tends to become somewhat smaller, and the conductor exerts a stress on the insulation material in a direction radially of the coil. However, there is a cushioning effect provided by the Refrasil fibers, which further tends to inhibit cracking of the glass.

The product of the sintering operation when cooled is milk white in color in contrast to glass which has been fully melted, the latter appearing quite clear usually. Further, as already noted, the turns of the coils are themselves clearly visible.

For the purpose of fully encapsulating a coil the structure of FIGURE 3 may be provided about its periphery with a winding of E glass similar to that employed in the sheath 6. The coil is then again subjected to a firing operation at about 875° C. and the E glass melts, to provide an encapsulation 14 (FIGURE 4).

In the instance of FIGURE 4 the coil has been retained on the spool 8, together with the Fiberfrax 9. However, it is important to note that the coils thus formed (FIGURE 3) are quite rigid and self-supporting. Accordingly, the core 8 and Fiberfrax 9 may be removed before encapsulation, if so desired.

FIGURE 5 is a further illustration of an insulated electrical conductor arranged to provide for somewhat greater volumetric expansion of the conductor element. Thus, in FIGURE 5 the copper conductor is designated by the numeral 15 and is stranded together with a volatilizable plastic material 16. The material 16 is suitably a plastic which decomposes to its monomer and vaporizes without any substantial carbon deposit. The acrylates and polyurethanes serve this purpose. The wrapping about the conductor of FIGURE 5 is designated by the numeral 5' and the sheath by the numeral 6', since these materials are the same as those described in connection with FIGURE 2.

As shown in FIGURE 6 the strands of plastic 16 may occupy a considerable volume of the core. To form a coil with such a conductor it is wound as described in connection with the structure of FIGURE 3, then the coil is subjected initially to a temperature between about 250–400° C. and maintained at this temperature for several hours. Under this condition the plastic material decomposes and effectively distills through the pores of the wrapping 5' and the sheath 6'.

Due to the elimination of the plastic or resin material there are provided, within the core, expansion cavities 17 of greater volumetric capacity than set forth in connection with FIGURE 3. Further, the expansion cavities have a configuration conforming substantially to that of the plastic material which has been eliminated.

The coil, after heating to eliminate the plastic, is sintered at a temperature of approximately 825–850° C., and the handling thereafter is in the same manner as described in connection with the structures of FIGURES 3 and 4.

Consequently the resultant conductor has a cross-section such as that illustrated in FIGURE 7.

For somewhat more uniform arrangement of the cavities dispersed through the core, the embodiment of the electrical conductor illustrated in FIGURES 8 and 9 may be employed in coil formation. Thus, as shown in FIGURE 8, a conductor in the form of a stranded copper wire 18, each wire provided with a plastic coating 19, may be utilized. The plastic material in this instance also may suitably be nylon or Mylar, for example.

In this instance the initial heating in the case of Mylar is conducted at a temperature of about 550° C. with a good flow of air over the formed coil to inhibit carbon formation. If nylon is utilized as the plastic the temperature may be slightly lower, that is, 250–450° C., but still a good flow of air should be employed to inhibit carbon formation.

A coil formed with the conductor of FIGURE 8 is then sintered, as described hereinbefore, to complete the coil formation.

As shown in FIGURE 9 the insulated conductor which forms the coil then has a cross-section such as illustrated in FIGURE 9, the expansion cavity areas being somewhat larger, as indicated at 20.

In FIGURES 8 and 9 the insulation material forming the wrapping of Refrasil is designated at 5" and the E glass is indicated at 6".

As will be noted from the foregoing the expansion cavities extend longitudinally with the twisted strands and thus room for expansion of the wire conductor is provided at the most advantageous areas.

Coils produced in accordance with the foregoing have been made using various sizes of wire and with varying number of wire strands and resin monofilaments. Good results have been obtained with No. 30 and No. 33 wire employing varying amounts of decomposable resinous materials. Similarly also the amount of insulation may be varied—the inner layer being present in sufficient extent preferably to provide the cushion, and the sheath being present to an extent to provide the impervious film over the inner layer.

Such coils have withstood the application of thousands of volts without insulation breakdown. Also indicative of the sturdiness of the coil structure is that when encapsulating with the lower softening point material considerable stress is imposed, due to the shrinkage of the cooling encapsulating material, which results in shrinkage of the coil itself. No adverse effects as to cracking are noted however upon this contraction.

It will be understood that this invention is susceptible to modification in order to adapt it to different usages and conditions and accordingly, it is desired to comprehend such modifications within this invention as may fall within the scope of the appended claims.

What is claimed is:

1. An article of manufacture comprising a core made up of twisted elongated copper wires, said twisted wire having dispersed throughout the core strand cavities to provide expansion space, electrical insulation enclosing said copper wire core composed of siliceous resilient material of relatively high temperature softening point, said resilient siliceous insulation being readily slippable relative to said core, and an outer covering of siliceous material which is of relatively lower temperature softening point than said resilient siliceous insulation material, said lower softening point resilient siliceous material adhering to the outer surface of said higher softening point insulation material and providing a continuous layer of insulation material over said copper wire core.

2. An article of manufacture, comprising a core composed of intertwisted strands of electrically conductive copper wire and having dispersed throughout the core strand cavities to provide expansion space, and electrical insulation wound on said core, said insulation comprising an inner resilient layer of inorganic siliceous fibers of high softening point and providing an unbonded sleeve over said core, and an outer layer thereover of siliceous fibers of a relatively lower softening point and which is sintered to said inner layer without materially affecting the resilient nature of the inner layer, said inner layer providing a resilient wrapping between said core and said outer siliceous layer.

3. In combination, an electric coil, a core therewith of wound stranded material including an electrical conductor copper wire having dispersed throughout the core strand cavities to provide expansion space for said wire, electrical insulation disposed around said core which is slippable relative to said core and comprising an inner resilient wrapping therearound of substantially alkali-free high softening point siliceous fibers and an outer sheath of lower softening point siliceous fibers, said electrical insulation extending around the conductor over the entire length of said expansion cavities and providing a cushion between adjacent turns of the coil, said outer sheath providing a continuous impervious layer which functions as a barrier to the entry of air and oxidizing agents into the body of the conductor.

4. As an article of manufacture an electric coil comprising multiple turns of a core made up of intertwisted elongated strands of wire having dispersed throughout the core strand cavities to provide expansion space for the wire, and insulation material disposed around and enclosing said turns and extending over the length thereof, said insulation material of adjacent turns being in contacting relation, and said insulation material comprising an inner wrapping and an outer sheath of siliceous material sintered to the inner wrapping and a continuous layer over said inner wrapping, said inner wrapping being resilient and forming a loose sleeve of insulation over said wire to provide for relative sliding movements between the insulation and the wire.

References Cited in the file of this patent

UNITED STATES PATENTS

| | | |
|---|---|---|
| 2,361,374 | Abbott | Oct. 31, 1944 |
| 2,390,039 | Slayter et al. | Nov. 27, 1945 |
| 2,484,214 | Ford et al. | Oct. 11, 1949 |
| 2,504,764 | Vollrath | Apr. 18, 1950 |
| 2,848,794 | Roth | Aug. 26, 1958 |
| 2,867,032 | Gehrke et al. | Jan. 6, 1959 |

FOREIGN PATENTS

| | | |
|---|---|---|
| 710,711 | Great Britain | June 16, 1954 |